US005900831A

United States Patent [19]

Eisele et al.

[11] Patent Number: 5,900,831

[45] Date of Patent: May 4, 1999

[54] METHOD FOR PRODUCING VARIABLE DENSITY/ELECTRIC DIPOLE PROPERTY CHAFF DECOY MATERIAL

[76] Inventors: John A. Eisele, Hillcrest Heights; Robert M. Mason, Temple Hills, both of Md.; Francis J. Campbell, Alexandria, Va.

[21] Appl. No.: 05/456,572

[22] Filed: Mar. 26, 1974

[51] Int. Cl.[6] ..................... G01S 7/38

[52] U.S. Cl. ..................... 342/12; 342/13

[58] Field of Search ..................... 343/18 B, 18 E; 342/12, 13

[56] References Cited

U.S. PATENT DOCUMENTS

| | | | |
|---|---|---|---|
| 3,536,010 | 10/1970 | Moldeus | 342/5 X |
| 3,544,997 | 12/1970 | Turner et al. | 342/12 |

*Primary Examiner*—John B. Sotomayor

[57] ABSTRACT

This disclosure relates to dielectric chaff materials or fibers which are small in character for packing and expandable on release to produce clouds of great cross section. Polymer materials are treated chemically and/or irradiated with nuclear or electronic radiation which partially decomposes the polymer. Upon release, the polymer is heated to create gas bubbles from within which expand the dielectric fibers to change the density and shape of the dielectric.

19 Claims, 1 Drawing Sheet

METHOD FOR PRODUCING VARIABLE DENSITY/ELECTRIC DIPOLE PROPERTY CHAFF DECOY MATERIAL

BACKGROUND OF THE INVENTION

This invention relates to chaff dispersing and more particularly to dispersed chaff dipoles which have improved fall rate.

Chaff is known to be primarily an electromagnetic reflector material used for military purposes as a countermeasure against enemy radars. Chaff may be made of solid metallic elements of a specific length and diameter. Also, it may be made of small non-metallic elements coated with a thin coating of a particular metal, thus bringing about a savings of metal. Millions of these elements may be packaged into a dispenser and dispersed as necessary to present false target information to confuse the enemy. Chaff is typically packaged in units about twice the size of a cigarette pack. When individual fibers of such a unit are widely dispersed in the atmosphere they create a radar echo similar to that of a small aircraft. If a stronger echo is wanted, one dispenses two or three units simultaneously.

The effects produced by chaff depend upon the manner in which it is used. If the bundles are dropped continuously (a continuous or stream drop) they will cause a long line of radar returns across a PPI scope. Several side by side stream drops will form a chaff corridor and an aircraft flying within that corridor cannot be seen by certain radars using certain frequencies. These applications of chaff constitute a form of jamming.

Chaff bundles may also be dropped randomly (a random drop) in which case the radar scope may become filled with chaff returns so that the radar operator has difficulty finding the aircraft. This is a deception technique similar to false target generation. Finally, chaff may be dropped in bursts of several bundles. Against a tracking radar, a chaff burst will create a larger radar echo than the dropping vehicle. Thus, the radar will tend to lock on to the chaff rather than the aircraft. This technique is thus very similar to track breaking. In this role, chaff is used also for ship protection

SUMMARY OF THE INVENTION

This invention is directed to improved chaff decoys which produce clouds or corridors of greater radar cross section, which are faster blooming, and which have a longer lasting effectiveness than present types of chaff. The chaff material is of a type which can be packaged into a small unit, the elements of which upon being dispensed increase in size to change their density and shape. This type of chaff has a slow fall rate, is dispersed easily, and does not clump together or "birdnest" upon being dispensed. Chaff particles are made, packaged, and irradiated with a source of nuclear electronic radiation which produces trapped gases within the particles. When these particles are dispensed, the particles are heated to the softing point, which causes a foaming reaction by release of the gases that expand the particles to a larger size and lower density. Therefore, the dispersed particles remain in the air much longer than they would otherwise due in part to a maximum air resistance shape which diminishes their fall rate.

It is therefore an object to produce chaff which will have the properties to remain in the air a long period of time, to be easily dispersed, and to offer a large radar cross section.

Another object is to provide a chaff which after falling will float on water to give a false signal.

DESCRIPTION OF THE PREFERRED EMBODIMENTS

Figure 1:
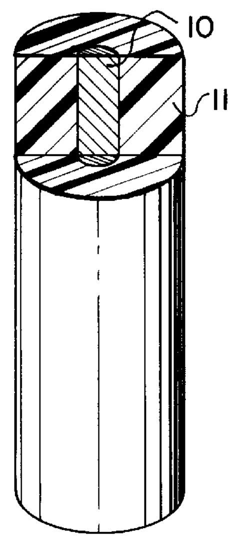
FIG. 1 illustrates a treated chaff dipole element.

Now referring to the drawing, FIG. 1 there is shown an embodiment of the invention. As shown, the drawing illustrates a small diameter metal rod 10 coated with a coating of a heat foamable polymer plastic material 11 selected from a group represented by polymethyl methacrylate (Plexiglas, Lucite, Perspex,) polystyrene, polyvinyl chloride (PVC, polyvinyl chloride-binyl acetate (PVC/VA), polyvinylformal (Formvar), Mylar, Dacron, and Nylon.

These dipole elements may be made by drawing heated rods into very thin fibers or by an extrusion process and then coating the thin fiber with the plastic material by a dip coating process or by an extrusion process. The coated fibers are exposed to radiation (e.g., gamma rays) then cut into desired lengths and packaged into a chaff particle dispenser as is well known in the chaff art. Exposure to radiation causes small pockets of entrapped hydrogen, methane, carbon dioxide, and carbon monoxide to form within the body of the polymer.

Figure 2:
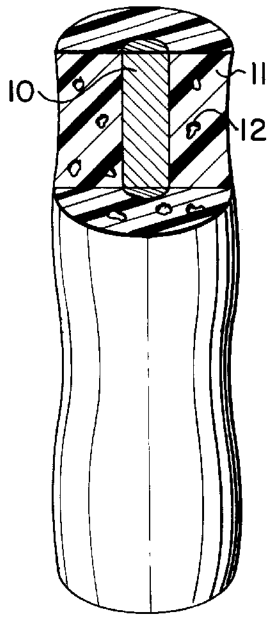
FIG. 2 illustrates the treated chaff dipole element of FIG. 1 after foaming.

The particles, when dispensed, are heated to a temperature of from about 70 to about 200 degrees Celsius. Upon being heated, the molecular bonds, already weakened by the radiation, give away due to melting, thus, allowing the gas bubbles 12 to expand. This expansion changes the appearance of the coating such that it appears as a foam similar to that of foam drinking cups as illustrated in FIG. 2. The resultant change reduces the density of the coating so that the particles fall at a reduced rate. Further, since the density of the particles is reduced, the particles will be dispersed into a greater area than they would be otherwise due to the dispensing pressure and change in size; they also will remain in the dispersal area a much greater length of time and will have a slower fall rate than usual.

The reaction that takes place when the radiation treated elements are heated causes the polymer coating to foam. This foaming does not result in a smooth surface but one that has many protuberances which will impinge on the air molecules, as each chaff particle falls, to impede the fall rate. Furthermore, since the chaff is"puffed" upon being heated the reaction will act upon each element to force the elements away from each other. Thus, "birdnesting" will be prevented.

Since in this embodiment the chaff elements are formed with a metallic center rod the elements will reflect the radar signal thereby falsely appearing as a target; and, since the elements have a slow fall rate the target signal will last for a long period of time. Thus, the platform or aircraft that dispenses the chaff elements will have had time to penetrate or escape to other areas.

Figure 3:
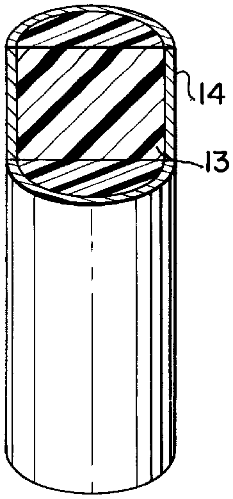
FIG. 3 illustrates a metallic coated plastic dipole element.
Figure 4:
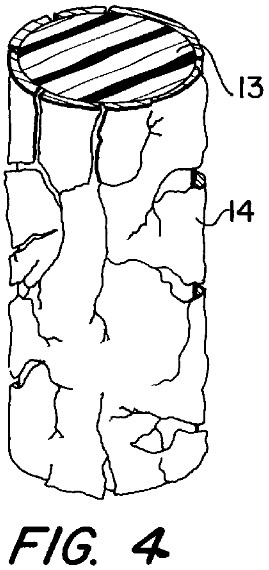
FIG. 4 illustrates the dipole element of FIG. 3 subsequent to foaming.

Thus, it is seen that a much greater number of chaff particles may be packaged into a dispenser prior to being heated than could be placed into the dispenser subsequent to heat treatment. An analogy is packing of pop corn before it is heated and then utilizing the pop corn subsequent to heating. In the chaff dispensing art, knowledge to form the elements of light weight materials such as plastic, nylon strands, etc 13, and then apply a metallic coating 14 onto the elements is well known as shown in FIG. 3. These elements reflect radar signals in the same manner as the metal elements coated with a polymer. It is known that radar signals may be reflected to give a false appearance of targets and be absorbed to give the appearance that no target is in the area of surveillance. Thus, chaff elements may be made with a polymer which is coated with, for example, a silver coating. These elements can be irradiated, packaged for dispensing, and then heated upon being dispensed to cause foaming of the polymer material. The foaming reaction breaks the silver coating as shown in FIG. 4, which affects the radar reflection capabilities; however, the elements are enlarged due to foaming and the break in the silver coating will create a greater electrical resistance to act as an absorber of radar signals. Either way, the target will not appear the same as it would appear if the chaff were not dispensed.

This invention is not directed to the dispenser or method of dispensing. For the heat source, the dispenser may be made in combination with a heater or pyrotechnic means such that the chaff elements are heated as they are dispensed. To this end, the elements could be preheated in the dispenser to a temperature just under the temperature at which they would foam, then the additional heating required to produce foaming would be added at the time of being dispensed. In this manner, the dispensed elements would not require as long a period in the heat zone. In the event the chaff is to be dispensed by an aircraft, the chaff elements could be directed into the exhaust plume from the engine. In this manner, an additional heat source would not be required. In those dispensers which require preheating, the elements in the dispenser could be preheated electrically by use of a coil wrapped around the dispenser element within which the chaff elements are packaged. It is not necessary that the chaff elements be preheated, however, if so, the time requirement for heating the elements to their final required temperature will be less, thereby requiring less time in the exhaust gases. Of course, some exhaust gases could be diverted to a special discharge chamber so that the chaff elements would not be directly in the main exhaust stream.

Another example of a chaff element which may be made and reacted as above includes mixing metal particles into a dielectric matrix subsequently chemically treating and/or irradiating the compound and heating as set forth above.

In carrying out the teaching of the invention, the radiation dose, time of exposure of the chaff elements to the radiation, and the heat at which the elements foam depends on the material from which the elements are formed. Further, it has been determined that the chaff elements may be irradiated by drawing a continuous coated element through a radiation field, subsequently cutting the continuous element into the desired chaff element lengths and placing the chaff elements into the dispenser; or the continuous coated element may be formed, cut into the desired lengths, radiated then placed into the dispenser; or the continuous element may be formed, cut into desired lengths, placed into the dispenser and then irradiated. The important thing is that the chaff elements be chemically treated and/or irradiated with gamma rays or electrons to produce small pockets of entrapped hydrogen, methane, carbon monoxide, carbon dioxide or other gaseous products within the polymer so that upon heating to a sufficient temperature the polymer will foam.

An example of forming, irradiating, and heating a chaff dipole element is as follows: A thin wire is coated with a coating of polymer such as polymethyl methacrylate as shown in FIG. 1 and placed in a radiation field such as Cobalt-60 for a dose of from $10^2$ to about $10^8$ rads. The chaff dipole elements are cut into dipole lengths and packaged into a dispenser. The dipole elements are dispensed into a heated area and heated to a temperature of about 140° C. The dipole elements foam and the polymer coating expands to about three times its original thickness.

Another example involves coating a nylon strand with a coating of silver, irradiating the silver coated nylon with about $83.2\times10^6$ roentgens of radiation, packaging, and then dispensing the dipole elements into a heated area at a temperature of about 140° C. These dipole elements expand to about double their volume in size, consequently the density is reduced by about two.

It has been determined that dipole elements made, irradiated, and heated by the teaching of this invention may be used as a surface electronic countermeasure which could be used in oceanic waters to produce a false signal for radar making a surface search. Therefore, such chaff elements may be used as a countermeasure for air, land or sea.

Figure 5:
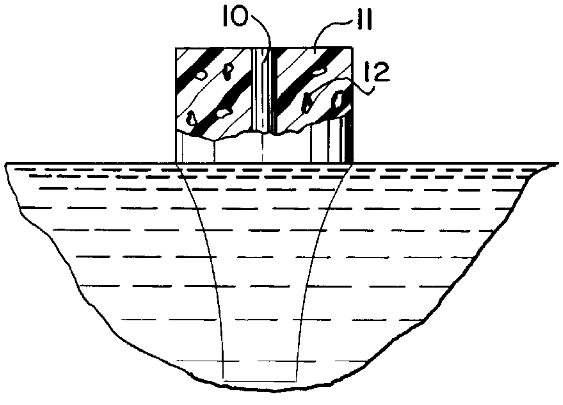
FIG. 5 illustrates a dipole element treated over only one half its length with one end foamed and floating in water.

It has been determined that dipole elements such as shown in FIGS. 1 and 3 may be irradiated or chemically treated over only about half its length. In this case the dipole elements will foam over only about half its length and appear after foaming as shown in FIG. 5. Such dipole elements may be dropped from the air onto water and the dipole element will float on top of the water with the untreated portion of the dipole element floating beneath the foamed portion and within the water. Thus the dipole element would make a good reflector from the water surface.

It has been determined that rather than irradiating such dipole elements, such elements may be formed to incorporate gas bubbles in the dielectric. These elements may be formed by mixing a foaming agent such as azodicarbonamide in with polystyrene, polyethylene, polyacetates, as well as other plastics. Another foaming agent dinitrosoterephthalamide may be mixed with polystyrene and polyacetate. Further oxybis benzenesulfonyl hydazide may be mixed with polyethylene. Such dipole elements would be formed as described above for the elements illustrated in FIGS. 1, 3 and 5 with the blowing agent mixed with the basic material. Thus no radiation would be required to cause foaming.

Obviously many modifications and variations of the present invention are possible in light of the above teachings. It is therefore to be understood that within the scope of the appended claims the invention ray be practiced otherwise than as specifically described.

What is claimed and desired to be secured by Letters Patent of the United States is:

1. A chaff element in which the density and electric dipole properties are controlled;

said chaff element including, a metallic dipole, an irradiated dielectric material in combination with said metallic dipole, whereby the density of said chaff element changes upon subjecting said chaff element to heat.

2. A chaff element as claimed in claim 1; wherein, said metallic dipole forms the central portion of said chaff element.

3. A chaff element as claimed in claim 1; wherein, said metallic dipole is coated onto said dielectric material.

4. A chaff element as claimed in claim 1; wherein, said metallic dipole and dielectric material are mixed together.

5. A method of treating chaff elements in which the density and electric dipole properties of said chaff elements are controlled; which comprises, irradiating said chaff elements with radiation.

6. A method as claimed in claim 5; in which, said chaff elements are irradiated with sufficient radiation to receive a dose of from about $10^2$ to about $10^8$ rads.

7. A method as claimed in claim 5; in which, said chaff elements are formed by coating a polymer material onto a metallic strand prior to irradiation.

8. A method as claimed in claim 7; in which, said chaff elements are irradiated with sufficient radiation to receive a dose of from about $10^2$ to about $10^8$ rads.

9. A method as claimed in claim 5; in which, said chaff elements are formed by a silver coating on a strand of polymer material.

10. A method as claimed in claim 9; in which, said chaff elements are irradiated with sufficient radiation to receive a dose of about $83.2 \times 10^6$ rads.

11. A method as claimed in claim 5; in which, said chaff elements are formed by a composite of metal particles dispersed throughout a dielectric matrix.

12. A method as claimed in claim 7; which includes, dispensing said irradiated chaff elements into a heat zone and heating said chaff elements sufficiently to produce foaming.

13. A method as claimed in claim 12; in which, the heat applied is from about 50° C. to about 250° C.

14. A method as claimed in claim 9; which includes, dispensing said irradiated chaff elements into a heat zone and heating said chaff elements sufficiently to produce foaming.

15. A method as claimed in claim 14; in which, the heat applied is from about 50° C. to about 250° C.

16. A method as claimed in claim 1; in which, additions are introduced in the basic dielectric material to increase the amount of trapped gases produced by radiation.

17. A chaff element in which the density and dipole properties are controlled;

said chaff element including, a metallic dipole, a dielectric material in combination with said metallic dipole, chemical blowing agents compounded into said dielectric material whereby heating said chaff element produces foaming of said chemical blowing agents thereby changing the density of said chaff element.

18. A chaff element as claimed in claim 1; in which said dielectric; materials are selected from a group consisting of polymethyl methacrylate, polystyrene, polyvinyl chloride, polyvinyl chloride-vinyl acetate, polyvinyl-formal, Mylar Dacron ann nylon.

19. A chaff element as claimed in claim 17; in which said foaming agents are selected from a group consisting of azodicarbonamide, dinitrosoterephlh-alamide and oxybis benzenesulfonyl hydrazide.

* * * * *